Jan. 26, 1971 T. T. FJALLBRANT 3,559,113

FILTERS UTILIZING LADDER NETWORKS

Filed Sept. 23, 1968

INVENTOR

Tore Torstensson Fjallbrant

BY Hane and Baxley

ATTORNEYS

United States Patent Office 3,559,113
Patented Jan. 26, 1971

3,559,113

FILTERS UTILIZING LADDER NETWORKS

Tore Torstensson Fjällbrant, Fjaras, Sweden, assignor to Telefonaktiebolaget L M Ericsson, Stockholm, Sweden, a corporation of Sweden Filed Sept. 23, 1968, Ser. No. 761,487
Claims priority, application Sweden, Sept. 28, 1967, 13,337/67
Int. Cl. H03h *7/10*
U.S. Cl. 333—70 2 Claims

ABSTRACT OF THE DISCLOSURE

A filter comprises a plurality of capacitors connected in series between a signal source and the input of an amplifier. A plurality of resistors each having one terminal connected to a different junction of adjacent capacitors, and to the junction of an end capacitor and the input of the amplifier. The other ends of alternate resistors including the resistor connected to the amplifier junction receive signals related to the signal source; and the other end of each of the remaining resistors is connected to the output of the amplifier.

The present invention relates to a filter arrangement consisting of a ladder network of resistances and capacitors. The invention is a further development of the technique, described in Ericsson Technics No. 2, 1967, pages 214–238, and page 260. On pages 214–238 of the journal a transfer function F, is shown, consisting of a fraction with a polynomial in the denominator and a constant in the numerator. The transfer function can be realized by a ladder network of resistances and capacitors in combination with an active circuit element in the form of a transistor- or a vacuum tube connected to the output side of the network. On page 260 there is also shown that a transfer function with a polynomial in the numerator can be realized with the same simple ladder network if the input signal is fed not only to the input of the ladder network, but also to those shunt branches, in the ladder network, which are not connected to the circuit element on the output side. However not all numerator polynomials can be realized in this way. A necessary condition is that the polynomials have roots (corresponding to the transmission zeros of the transfer function) only in the left half of the complex frequency plane. An object of the present invention is to remove this disadvantage by permitting numerator polynomials with roots also in the right half of the complex frequency plane.

Briefly, the invention contemplates the design of a filter arrangement in which the ladder network is calculated starting from the given numerator polynomial of the transfer function in a conventional way. The given numerator polynomial is thereafter realized by feeding signals of the same kind as the input signal, but with an amplitude and sign determined from the transmission zeros of the numerator polynomial and the admittances of the ladder network to the shunt elements in the ladder network which are normally connected to ground. It might be necessary to modify one or more of the shunt elements connected to the circuit element on the output side in such a way, that instead of one shunt element connected to the circuit element, two elements are connected. One terminal of each of the two elements is connected to the inter-connection point between two series elements and in the other terminal of each of the elements is connected, respectively, to a signal source for a signal of the same kind as the input signal and to the circuit element for feedback of an output signal.

Figure 1:
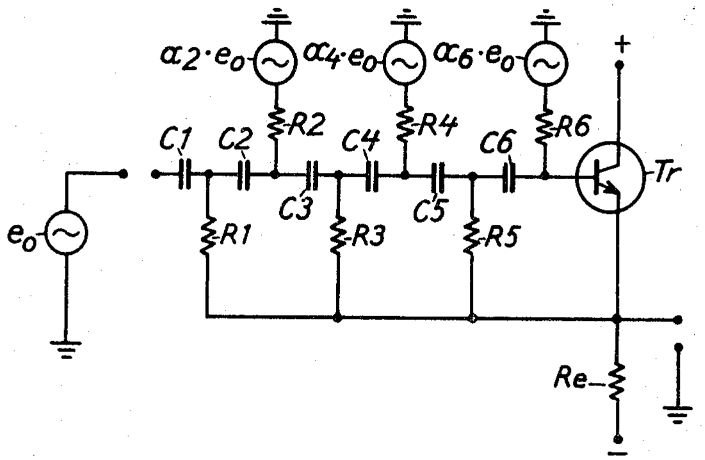
Figure 2:
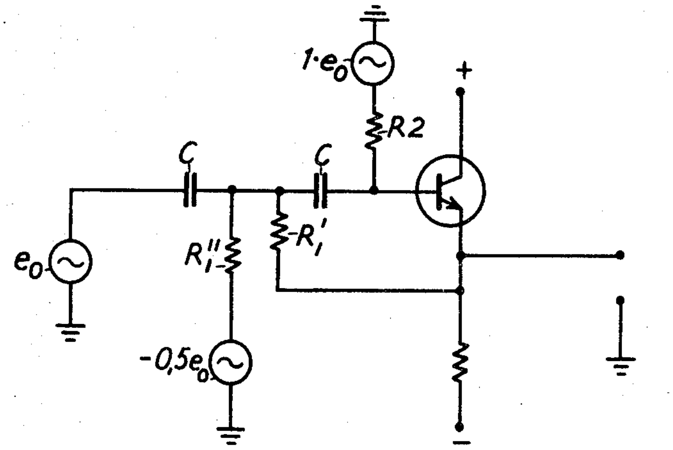
Figure 3:
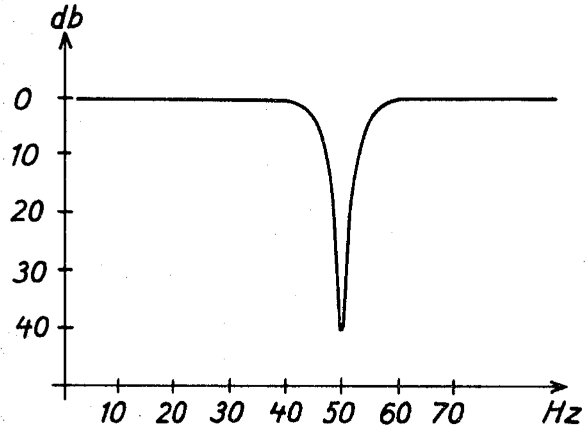

The invention will be described in greater detail in connection with the accompanying drawing, where FIG. 1 shows a filter of highpass type, FIG. 2 shows a filter of a bandstop type for the frequency 50 Hz. and FIG. 3 shows the attenuation curve for the filter according to FIG. 2.

While a detailed description of the invention follows for certain embodiments thereof, these embodiments should not be construed to limit the scope of the invention which is defined by the appended claims.

The filter arrangement according to FIG. 1 consists of a ladder network with capacitors as series elements and resistances as shunt elements and of a transistor circuit *Tr* on the output side. The filter arrangement is intended to be connected to an input signal source $e_o$. Each other connection point between the series elements, are via resistances connected to the emitter of the transistor. The emitter which is connected via resistance R*e* to a negative voltage source forms the one output terminal of the filter arrangement. The other connection via resistances $R_2$, $R_4$ and $R_6$, to signal sources $\alpha_2 e_o$, $\alpha_4 e_o$ and $\alpha_6 e_o$, respectively. The different elements of the ladder network comprising resistances $R_1$–$R_6$ and capacitors $C_1$–$C_6$ and the signal sources are so dimensioned that the admittance of the ladder network and the emitted signals of the signal sources with respect to magnitude and sign satisfy the desired transfer function F of the filter arrangement according to the relation:

$$F=\frac{1+\sum_{k=1}^{k=m}\alpha_k\cdot y_k\cdot\frac{1}{(-y_{21})_k}}{1+\sum_{p=1}^{p=n}(1-\beta_p)\cdot y_p\cdot\frac{1}{(-y_{21})_p}}$$

where:

$y_p$ is the admittance of a shunt element *p* of the total number *n* shunt elements of the ladder network;

$y_k$ is the admittance of a shunt element *k* of the *m* shunt elements of the ladder network to which signal sources are connected;

$(y_{21})_p$ is the transfer admittance of the part of the ladder network, which is situated between the input of the filter arrangement and the shunt element *p*;

$(y_{21})_k$ is the transfer admittance of the part of the ladder network, which is situated between the input of the filter arrangement and the shunt element *k*;

$\beta_p$ is the relation with respect to magnitude and sign between on the one hand the signal which is fed to the shunt element *p* from the output side of the circuit element and on the other hand the output signal of the filter arrangement;

$\alpha_k$ is the relation with respect to magnitude and sign between on the one hand the signal which is fed to the shunt element *k* in the ladder network from one of the signal sources and on the other hand the signal fed, during operation from the input source to the series element of the filter arrangement on the input side; and

*k, p, m, n,* are integers which satisfy the relations:

$$1\leq k\leq m$$

$$1\leq p\leq n$$

$$m\leq n$$

In the filter arrangement according to FIG. 1 is $$\beta_1=\beta_3=\beta_5=1$$

In the filter arrangement according to FIG. 2 the ladder network has two capacitors C as series elements and two resistances $R_1'$ and $R_1''$, which together form a shunt element. The element $R_1'$ of the shunt element is directly connected to the emitter of a low output impedance transistor circuit, while the remaining element $R_1''$ is connected to a signal source $-0.5 \cdot e_0$. A second shunt element R2 is connected to a signal source $1 \cdot e_0$. The transfer function of the filter arrangement has the form $$\frac{s^2+1}{s^2+0.1s+1}$$

where $s$ is the complex angular frequency. The elements included in the filter arrangement have approximately the following values:

$$R_1'=470\Omega$$

$$R_1''=10K\Omega$$

$$R_2=26K\Omega$$

$$C=1\ \mu f$$

The extraordinary selectivity of the arrangement is shown in the attenuation curve according to FIG. 3.

FIG. 2 shows a variation of the filter arrangement wherein at least one of the shunt elements (for instance, R1 of FIG. 1), is composed of two shunt elements $R_1'$ and $R_1''$ of the same type. The shunt element $R_1'$ is connected between the series connected capacitors C and the emitter (output terminal) of the transistor (signal amplifying means). The shunt element $R_1''$ is connected between the series connected capacitors C and a signal generator $-0.5e_0$.

In such a case, the admittance of element $R_1'$ is $y'_p=\beta \cdot y_p$, the admittance of element $R_1''$ is $y''_k=y_p-y_p'$ and $$\alpha'_k=\frac{\alpha_k \cdot y_k}{y''_k}$$

I claim:

1 A filter circuit comprising a ladder network, said ladder network comprising a first group of series elements of a first type, and a second group of shunt elements of a second type, one of said types being capacitors and the other of said types being resistors, a signal amplifying means having an input terminal and an output terminal, said series elements being connected in series to form a plurality of serially connected elements having first and second ends, said first end being adapted to receive an input signal, said second end being connected to the input terminal of said signal amplifying means, one end of each of said shunt elements being connected to the junction of adjacent series elements and the end of the series element connected to the input terminal of said signal amplifying means, respectively, means for connecting the other end of every other shunt element to the output terminal of said signal amplifying means, and the other end of at least some of the remaining shunt elements being adapted to receive signals related to the input signal, said filter circuit being characterized in that said ladder network and the signals are so dimensioned that the admittance of the ladder network and the signals with respect to magnitude and polarity satisfy the desired transfer function F of the filter circuit according to the relation:

$$F=\frac{1+\sum_{k=1}^{k=m} \alpha_k \cdot y_k \cdot \frac{1}{(-y_{21})_k}}{1+\sum_{p=1}^{p=n} (1-\beta_p) \cdot y_p \cdot \frac{1}{(-y_{21})_k}}$$

where:

$y_p$ is the admittance of a shunt element $p$ of the total number $n$ shunt elements of the ladder network;

$y_k$ is the admittance of a shunt element $k$ of the $m$ shunt elements of the ladder network which receive signals related to the input signal;

$(y_{21})_p$ is the transfer admittance of the part of the ladder network, which is situated between the input of the filter circuit and the shunt element $p$;

$(y_{21})_k$ is the transfer admittance of the part of the ladder network, which is situated between the input of the filter circuit and the shunt element $k$;

$\beta_p$ is the relation with respect to magnitude and polarity between the signal which is fed to the end of the shunt element $p$ remote from the end connected to the series connected circuit elements and the output signal of the filter arrangement;

$\alpha_k$ is the relation with respect to magnitude and polarity between the signal received by the shunt element $k$ in the ladder network and the input signal; and $k, p, m, n$ are integers which satisfy the relations:

$$1 \leqq k \leqq m$$

$$1 \leqq p \leqq n$$

$$m \leqq n$$

2. The filter circuit according to claim 1, wherein at least one of the shunt elements in the group of every other shunt elements, consist of two elements of the same type as the other shunt elements in the said group, one of said two elements being connected to the output terminal of said signal amplifying means and having an admittance $y_p'$ given by the relation $y_p'=\beta_p \cdot y_p$, and the second is to receive a signal and has the admittance $y_k''=y_p-y_p'$ whereby $\alpha_k'$ for the respective elements is determined by the relation:

$$o'_k=\frac{\alpha_k \cdot y_k}{y''_k}$$

References Cited

Thorp, J.: "Realization of Variable Active Networks," IEEE Trans. on Circuit Theory, CT-12 (1965), pp. 511–514.

Fjällbrant, Tore,: Ericsson Technics #2, 1967, pp. 192–193, 214–223, 259–267.

HERMAN KARL SAALBACH, Primary Examiner

W. H. PUNTER, Assistant Examiner

U.S. Cl. X.R.

330—26; 333—28, 76